United States Patent
Amada

(10) Patent No.: US 10,334,138 B2
(45) Date of Patent: Jun. 25, 2019

(54) IMAGE FORMING APPARATUS WITH PLURAL MOVABLE COLOR FORMING UNITS AND PRINT MODE MANAGEMENT BASED ON CORRECTION PROCESS PERFORMANCE

(71) Applicant: Oki Data Corporation, Tokyo (JP)

(72) Inventor: Daitetsu Amada, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/984,302

(22) Filed: May 18, 2018

(65) Prior Publication Data

US 2018/0352113 A1    Dec. 6, 2018

(30) Foreign Application Priority Data

May 31, 2017 (JP) .................... 2017-107405

(51) Int. Cl.
H04N 1/23 (2006.01)
H04N 1/29 (2006.01)
(Continued)

(52) U.S. Cl.
CPC ......... H04N 1/506 (2013.01); G03G 15/0136 (2013.01); G03G 15/0189 (2013.01);
(Continued)

(58) Field of Classification Search
None
See application file for complete search history.

(56) References Cited

U.S. PATENT DOCUMENTS 5,893,017 A * 4/1999 Yamamoto ......... G03G 15/0194
399/299
6,108,510 A * 8/2000 Nakane .................. G03G 15/01
399/298
(Continued)

FOREIGN PATENT DOCUMENTS

JP    2017-068286 A    4/2017

Primary Examiner — Scott A Rogers
(74) Attorney, Agent, or Firm — Muncy, Geissler, Olds & Lowe, P.C.

(57) ABSTRACT

An image forming apparatus includes (a) a plurality of image forming unit arranged along a transfer medium, each of which is arranged movable between a lower position and an upper position; (b) an estrangement controller to move each of the image forming units between these positions; (c) a print mode management part to determine a designated print mode; (d) an image forming part to select one or more of the image forming units corresponding to the designated print mode, and to form an image to be transferred to the transfer medium by using the selected image forming units; and (e) a correction process part that performs a correction process. Wherein (f) the correction process part regularly judges whether or not a correction process execution condition is satisfied, and performs a regular correction process when the correction process execution condition is satisfied, and (g) the print mode management part judges whether or not another print process in the designated print mode has been performed after a previous regular correction process, and sets a print mode based on a judgment result by the print mode management part.

8 Claims, 6 Drawing Sheets

(51) Int. Cl.
   H04N 1/50      (2006.01)
   G03G 15/00    (2006.01)
   G03G 15/01    (2006.01)
   H04N 1/46     (2006.01)
   H04N 1/60     (2006.01)

(52) U.S. Cl.
   CPC ............ G03G 15/50 (2013.01); H04N 1/233 (2013.01); H04N 1/2346 (2013.01); H04N 1/2361 (2013.01); H04N 1/2369 (2013.01); H04N 1/295 (2013.01); H04N 1/46 (2013.01); H04N 1/603 (2013.01)

(56) References Cited

U.S. PATENT DOCUMENTS

| | | | | |
|---|---|---|---|---|
| 6,738,594 B2 * | 5/2004 | Nakagawa | ......... | G03G 15/0194 399/299 |
| 7,106,981 B2 * | 9/2006 | Hashimoto | ........ | G03G 15/0136 399/25 |
| 7,443,406 B2 * | 10/2008 | Mohri | ................ | G03G 15/0194 347/115 |
| 8,189,207 B2 * | 5/2012 | Kobashigawa | ........ | G03G 15/50 358/1.13 |
| 8,417,165 B2 * | 4/2013 | Kasuya | .............. | G03G 15/0136 399/299 |
| 8,570,541 B2 * | 10/2013 | Nakamura | ............. | H04N 1/233 358/1.13 |
| 9,329,518 B2 * | 5/2016 | Saito | ................. | G03G 15/0136 |

\* cited by examiner

IMAGE FORMING APPARATUS WITH PLURAL MOVABLE COLOR FORMING UNITS AND PRINT MODE MANAGEMENT BASED ON CORRECTION PROCESS PERFORMANCE

TECHNICAL FIELD

This invention is related to an image forming apparatus.

BACKGROUND

Conventionally, in an image forming apparatus, such as, e.g., a printer, a photocopier, a facsimile, and a multifunction machine (MFP), for example, a color printer using an electrophotographic system capable of performing special color printing, white, cyan, magenta, yellow, and black image forming units, LED heads arranged corresponding to the image forming units, a transfer unit, and a fuser part, etc., are arranged, toner images formed in the image forming units are transferred onto a sheet in an overlapped manner to form a color toner image, and the color toner image is fused to the sheet in a fuser part to form a color image.

In this type of printer, correction process, such as, e.g., a color shift correction and a density correction, is performed for all image forming units that are arranged (for example, see Patent Document 1).

RELATED ART

[Patent Doc.1] JP Laid-Open Patent Application Publication 2017-68286

However, in the conventional printer, even when monochromatic printing only using a toner as a black developer is performed, since correction process is performed for image forming units of all colors: white, cyan, magenta, yellow, and black; the photosensitive drums, the charge roller, the development rollers, the toner supply rollers, etc., of the image forming units that are not in use are rotated, thereby possibly shortening the lifespan of the image forming unit or unnecessarily consuming the toners.

The present invention aims to solve the problems of the aforementioned conventional printer and provide an image forming apparatus in which the lifespan of the image forming unit is not shortened and the developers are not unnecessarily consumed by performing correction process.

SUMMARY

An image forming apparatus disclosed in the application includes (a) a plurality of image forming units, which are designed for different colors, that are arranged along a transfer medium, each of which is arranged in a movable manner in up and down directions with respect to the transfer medium such that each of the image forming units is movable between a lower position and an upper position, at the lower position where image carriers of the image forming units are able to come into contact with the transfer medium and at the upper position where the image carriers are distant from the transfer medium; (b) an estrangement controller that is configured to move each of the image forming units between the lower position and the upper position; (c) a print mode management part that is configured to determine one print mode among a plurality of print modes wherein the one print mode is defined as a designated print mode; (d) an image forming part that is configured to select one or more of the image forming units that correspond to the designated print mode, and to form an image to be transferred to the transfer medium by using the selected image forming units such that a print process is performed with the image formed by the selected image forming units; and (e) a correction process part that performs a correction process for the selected image forming units disposed at the lower position when the print process is performed in the designated print mode.

And, (f) the correction process part regularly judges whether or not a correction process execution condition is satisfied, and performs a regular correction process when the correction process execution condition is satisfied.

Also (g) the print mode management part judges whether or not another print process in the designated print mode has been performed after a previous regular correction process, which was performed most recently, was performed, and sets a print mode based on a judgment result by the print mode management part.

According to one embodiment of the invention, the image forming apparatus comprising: a plurality of image forming units, which are designed for different colors, that are arranged along a transfer medium, each of which is arranged in a movable manner in up and down directions with respect to the transfer medium such that each of the image forming units is movable between a lower position and an upper position, at the lower position where image carriers of the image forming units are able to come into contact with the transfer medium and at the upper position where the image carriers are distant from the transfer medium; an estrangement controller that is configured to move each of the image forming units between the lower position and the upper position; a print mode management part that is configured to determine one print mode among a plurality of print modes wherein the one print mode is defined as a designated print mode; an image forming part that is configured to select one or more of the image forming units that correspond to the designated print mode, and to form an image to be transferred to the transfer medium by using the selected image forming units such that a print process is performed with the image formed by the selected image forming units; and (e) a correction process part that performs a correction process for the selected image forming units disposed at the lower position when the print process is performed in the designated print mode, And, the correction process part regularly judges whether or not a correction process execution condition is satisfied, and performs a regular correction process when the correction process execution condition is satisfied.

The print mode management part judges whether or not another print process in the designated print mode has been performed after a previous regular correction process, which was performed most recently, was performed, and sets a print mode based on a judgment result by the print mode management part.

In this embodiment, correction processes are performed regularly. And, ti judges whether or not the another print process in the designated print mode has been performed after the previous regular correction process was performed, and sets the print mode based on a judgment result by the print mode management part.

Therefore, when printing in a special color print mode was not performed in a predetermined period, it automatically switches to a color print mode or a monochrome print mode, and when printing in a color print mode was not performed, it automatically switches to a monochrome print mode. Therefore, the correction process will not be performed on image forming units of every color.

As a result, the lifespan of the image forming unit will not be shortened and/or the developers will not be unnecessarily consumed.

DETAILED DESCRIPTIONS OF PREFERRED EMBODIMENT(S)

Hereinafter, embodiments of the present invention will be explained in detail with reference to the drawings. In this case, a color printer as an image forming apparatus will be explained.

Figure 2:
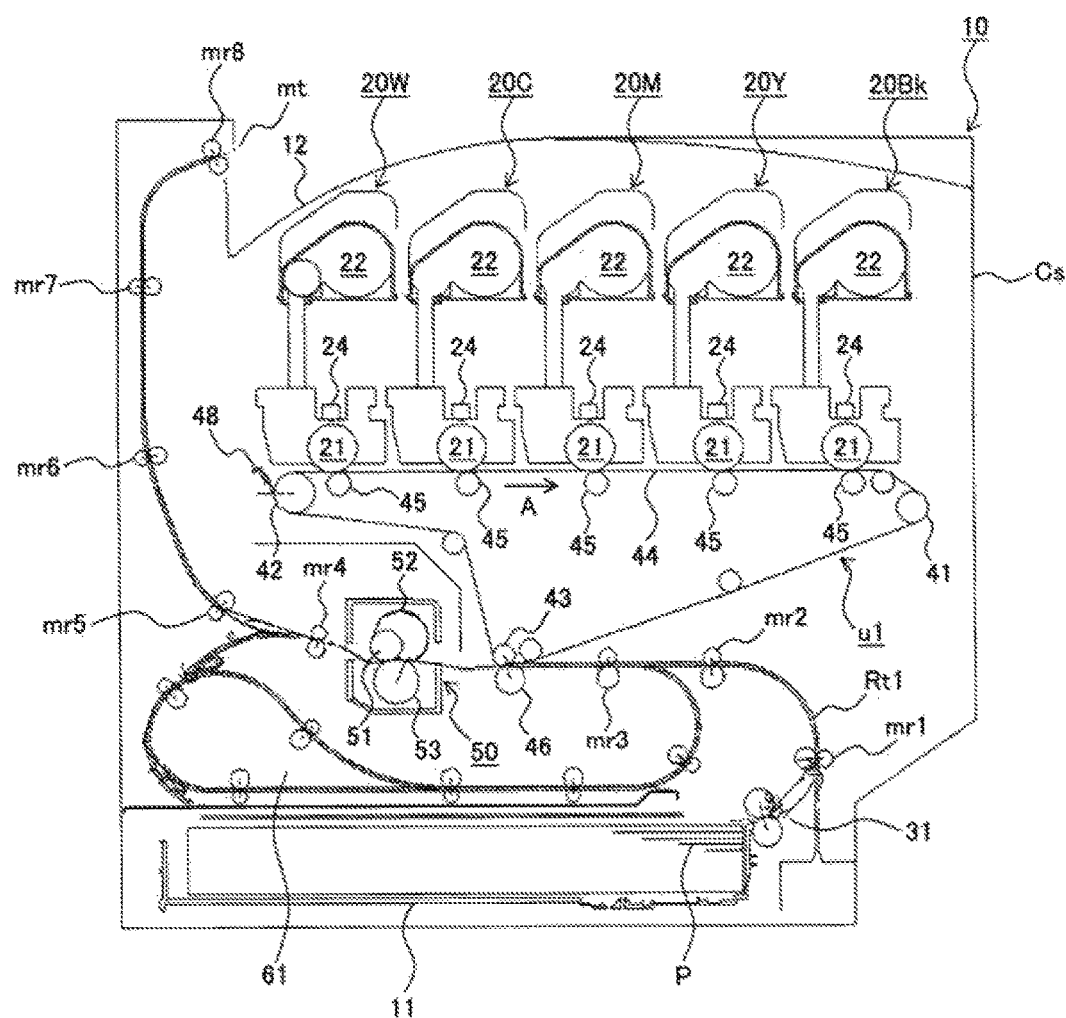
FIG. 2 is a conceptual diagram of the printer according to the embodiment of the present invention.

FIG. 2 is a schematic view showing a printer according to an embodiment of the present invention.

In the drawing, 10 denotes a printer, and Cs denotes a housing of the printer 10. A sheet cassette 11 as a medium accommodation section is provided at a lower part of the main body of the printer 10, that is, the device main body, and sheets P as mediums are arranged in the sheet cassette 11. Also, a sheet feeding mechanism 31 is arranged adjacent to the front end of the sheet cassette 11, and the sheet feeding mechanism 31 separates the sheets P one by one and sends them out from the sheet cassette 11 to the medium carrying path Rt1.

The sheet P fed by the sheet feeding mechanism 31 is carried on the medium carrying path Rt1 by the registration roller pairs mr1 and mr2 as first and second carrying members arranged above the sheet feeding mechanism 31 and a timing roller pair mr3 as a third carrying member.

In the upper part of the device main body, a plurality of image forming units, which are five white, cyan, magenta, yellow, and black image forming units 20W, 20C, 20M, 20Y, and 20Bk in this embodiment, are arranged in a freely movable manner in the up and down direction and along the horizontal direction, and LED heads 24 as exposure devices (exposure parts) are arranged so as to face the photosensitive drums 21 and above the photosensitive drums 21 as image carriers arranged in the image forming units 20W, 20C, 20M, 20Y, and 20Bk. The LED head 24 irradiates light in the patterns corresponding to the print data on the surface of the photosensitive drum 21 to expose the photosensitive drum 21 and form an electrostatic latent image as a latent image.

In this invention, the up-down direction and the horizontal direction are determined by a section where developmental image is transferred to a medium (or a sheet or transfer belt). In FIG. 2, the section is from roller 45 for unit 20W to roller 45 for unit 20Bk. Unit 20W is at the most upstream side, Unit 20Bk is the most downstream side. When the invented printer is installed on the ground as shown in FIG. 2, the "up-down" direction is directed to the up-down direction in the drawing. On the other hand, when the invented printer is installed vertically, which means by rotating the printer to the anti-clockwise direction by 90 degrees, the "up-down direction" of the invention is directed to the right-left direction in the drawing. The "horizontal direction" of the invention is directed to the up-down direction in the drawing.

In addition, a developer image forming part for forming a toner image as a developer image of each color is constituted by the image forming unit 20W, 20C, 20M, 20Y, and 20Bk and the LED head 24.

Each of the image forming units 20W, 20C, 20M, 20Y, and 20Bk is equipped with the photosensitive drum 21, an unillustrated charge roller as a charge device, an unillustrated development roller as a developer carrier, an unillustrated toner supply roller as a developer supply member, and a toner cartridge 22 as a developer accommodation part, etc., and the photosensitive drum 21 in which the surface is uniformly charged by the charge roller is exposed by the LED head 24, thereby forming an electrostatic latent image on the surface of the photosensitive drum 21. On the other hand, the toner as a developer supplied from the toner cartridge 22 is supplied to the development roller by the toner supply roller, adhered to the photosensitive drum 21, and a toner image is formed on the surface of the photosensitive drum 21.

In each image forming unit 20W, 20C, 20M, 20Y, and 20Bk, white, cyan, magenta, yellow, and black toners are arranged in the respective toner cartridges 22, and white, cyan, magenta, yellow, and black toner images are formed on the respective photosensitive drum 21.

Also, a transfer unit u1 is arranged below the image forming units 20W, 20C, 20M, 20Y, and 20Bk. The transfer unit u1 is equipped with: a driver roller 41 as a first roller linked to the belt motor 65 (FIG. 1) as a drive part for belt travelling that is rotatably arranged in the vicinity of the image forming unit 20Bk and rotated in response to the rotation of the belt motor 65; a driven roller 42 as a second roller rotatably arranged in the vicinity of the image forming unit 20W and rotated accompanying the rotation of the drive roller 41; a secondary transfer backup roller 43 as a third roller rotatably arranged below the drive roller 41 and the driven roller 42 and rotated accompanying the rotation of the drive roller 41 and the driven roller 42; an intermediate transfer belt 44 as a transfer medium extended in a travelable manner between the drive roller 41, the driven roller 42 and the secondary transfer backup roller 43, and moved in the arrow A direction along the image forming unit 20W, 20C, 20M, 20Y, and 20Bk companying the rotations of the drive roller 41, the driven roller 42, and the secondary transfer backup roller 43; a primary transfer roller 45 as a first transfer member arranged so as to face the photosensitive drums 21 of the image forming units 20W, 20C, 20M, 20Y, and 20Bk via the intermediate transfer belt 44; a secondary transfer roller 46 as a second transfer member arranged in a manner as to face the secondary transfer backup roller 43 via a sheet P and the intermediate transfer belt 44; a cleaning device 48 arranged in a manner as to face the driven roller 42 via the intermediate transfer belt 44, etc.

Note that the image forming units 20W, 20C, 20M, 20Y, and 20Bk are arranged from the downstream side to the upstream side in the carrying direction of the sheet P, and along the upstream side from the downstream side in the travelling direction of the intermediate transfer belt 44, and the image forming unit 20W is arranged on the most upstream side and the image forming unit 20Bk is arranged on the most downstream side.

Each primary transfer roller 45 sequentially superimposes toner images of each color formed on the photosensitive drums 21 and transfers (primary transfer) them on the intermediate transfer belt 44 to form a color toner image on the intermediate transfer belt 44. A primary transfer part is formed between each primary transfer roller 45 and each photosensitive drum 21.

The secondary transfer roller 46 transfers (secondary transfer) a color toner image formed on the intermediate transfer belt 44 to the sheet P and forms a color toner image on the sheet P. A secondary transfer part is formed between the secondary transfer roller 46 and the secondary transfer backup roller 43.

Also, a fuser part 50 as a fuser device (fuser unit) is arranged on a more downstream side than the secondary transfer part on the medium carrying path Rt1. The fuser part 50 is equipped with a heater 66 as a heat application body such as a halogen lamp, etc., inside, a heat application roller 51 as a first fusing member that is rotatably arranged, a fuser belt 52 as a second fusing member that surrounds the heat application roller 51 and is travelably arranged, a pressure application roller 53 as a third fusing member that is rotatably arranged in contact with the heat application roller 51 via the fuser belt 52, and the fuser part applies heat and pressure to the color toner image on the sheet P sent from the secondary transfer part to fuse it to the sheet P and forms a color image.

Also, on a more downstream side than the fuser part 50 on the medium carrying path Rt1, carrying roller pairs mr4 to mr7 as fourth to seventh carrying members are arranged, and an ejection roller pair mr8 as ejection members is arranged on a more downstream side than the carrying roller pair mr7. The sheet P in which color images are formed is ejected outside the device main body from the ejection port mt by the ejection roller pair mr8 after being carried by the carrying roller pairs mr4 to mr7, and loaded on the ejection tray (face down stacker) as a medium stacker.

In addition, a sheet reversing part 61 for forming images on both sides of the sheet P is arranged between the transfer unit u1 and the sheet cassette 11.

Also, an elevation device that is not illustrated is arranged in the image forming units 20W, 20C, 20M, 20Y, and 20Bk so that the image forming units 20W, 20C, 20M, 20Y, and 20Bk can be independently moved in the up and down direction and the photosensitive drum 21 can come in and out of contact with the intermediate transfer belt 44. The elevation device is equipped with an elevation motor 68 as a drive part for elevation (FIG. 1), an elevation mechanism that is not illustrated for moving the image forming units 20W, 20C, 20M, 20Y, and 20Bk in the up and down direction by driving the elevation motor 68, etc. In addition, the image forming units 20W, 20C, 20M, 20Y, and 20Bk are each positioned in a lower position as a first position in which the photosensitive drum 21 is in contact with the intermediate transfer belt 44, and an upper position as a second position in which the photosensitive drum 21 is disposed at a position distant from the intermediate transfer belt 44. Also, the image forming unit 20W, the image forming units 20C, 20M, and 20Y, and the image forming unit 20Bk are independently positioned in the upper position and the lower position by the elevation motor 68.

Next, the control device of the printer 10 will be explained.

Figure 1:
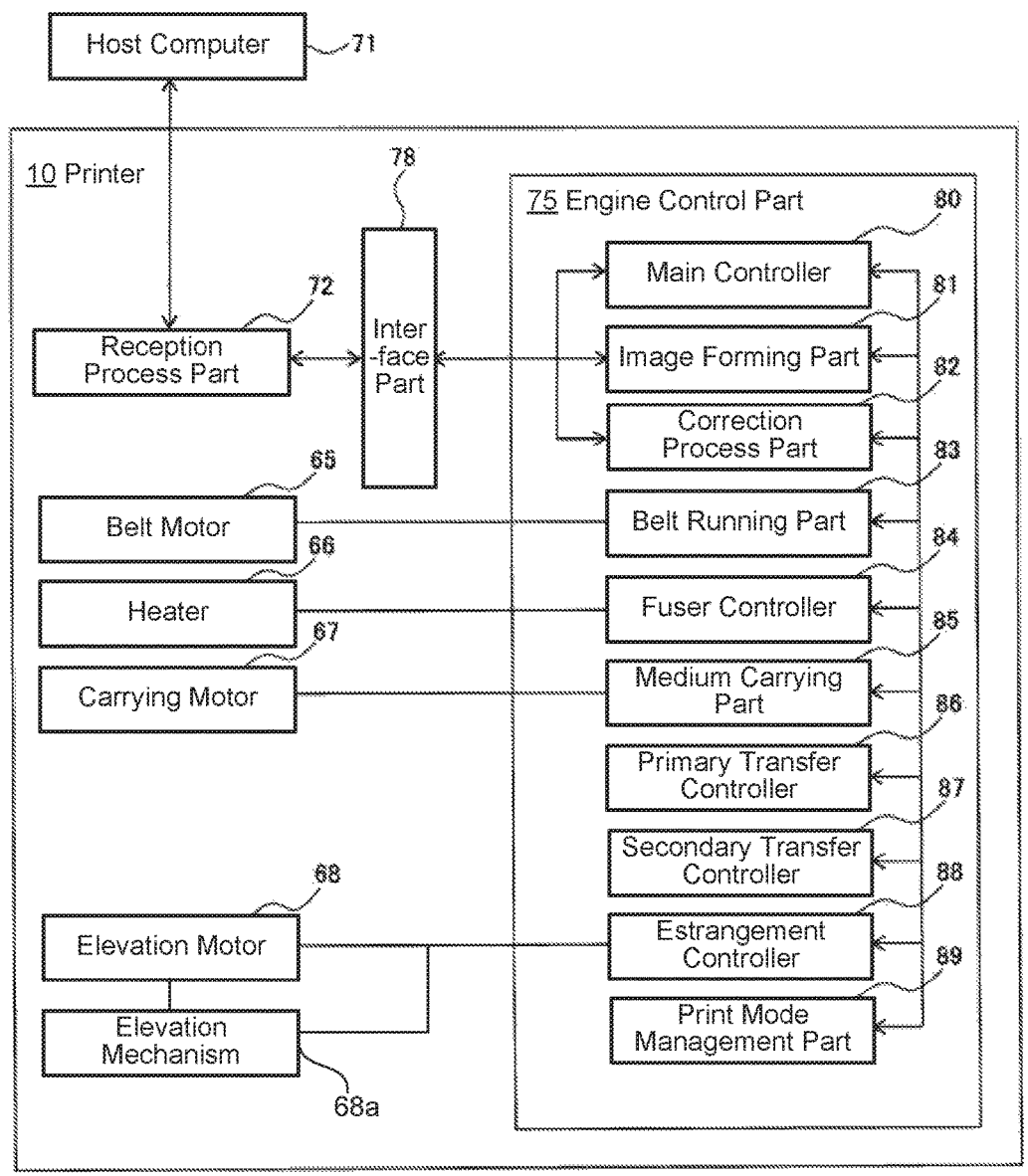
FIG. 1 is a control block diagram of a printer according to an embodiment of the present invention.

FIG. 1 is a control block diagram of a printer according to an embodiment of the present invention.

In the drawing, the reference numeral 10 denotes a printer, 71 denotes a host computer as a host device, 72 denotes a reception processing part that receives and analyzes print data, print command, etc., from the host computer 71 and generates information necessary to control the printer 10, which is, in this embodiment, color information included in the print data, 75 denotes an engine control part that performs the control of the printer engine part (not illustrated) arranged in the device main body, and 78 denotes an interface part that sends the print data and the color information generated by the reception process part 72 to the engine control part 75.

The engine control part 75 is equipped with: a main controller 80 that receives print data and color information from the interface part 78 and performs the control of the engine control part 75 for forming an image on the sheet P; an image forming part 81 for forming a toner image of each color based on the print data using the developer image forming part; a correction process part 82 which performs correction process such as a color shift correction, a density correction, etc., based on the usage condition, etc., of the image forming units 20W, 20C, 20M, 20Y, and 20Bk; a belt running part 83 which drives the belt motor 65 to move the intermediate transfer belt 44 (FIG. 2); a fuser controller 84 for controlling the fusing temperature by turning the heater 66 on and off; a medium carrying part 85 for driving the carrying motor 67 for rotating the registration roller pairs mr1, mr2, the timing roller pair mr3, the carrying roller pairs mr4 to mr7, the ejection roller pair mr8, etc.; a primary transfer controller 86 for applying a high voltage to the primary transfer rollers 45 to transfer the toner image on each photosensitive drum 21 onto the intermediate transfer belt 44; a secondary transfer controller 87 for applying a high voltage to the secondary transfer roller 46 to transfer the color toner image on the intermediate transfer belt 44 onto the sheet P; a estrangement controller 88 which, based on the color information, drives the elevation motor 68 according to a later described print mode, operates the elevation device to make the photosensitive drum 21 come in and out of contact with the intermediate transfer belt 44, and positions the image forming units 20W, 20C, 20M, 20Y, and 20Bk independently in the lower position and the upper position; a print mode management part 89 which sets and manages the print mode for the printer 10 based on the color information, etc.

The image forming part 81 sends instructions to the belt running part 83, the fuser controller 84, the medium carrying part 85, the primary transfer controller 86, and the secondary transfer controller 87 after receiving instructions of the main controller 80, forms an image with the image forming unit among the image forming units 20W, 20C, 20M, 20Y, and 20Bk corresponding to the print mode set by the print mode management part 89 and performs printing in the set print mode. That is, the image forming part 81 forms an image with a black toner by the black image forming unit 20Bk and performs monochrome printing in a monochrome print mode when a monochromatic print mode is set as a first print mode by the print mode management part 89; forms an image with cyan, magenta, yellow, and black toners by the cyan, magenta, yellow, and black image forming units 20C, 20M, 20Y, and 20Bk when a color print mode as a second print mode is set by the print mode management part 89; and forms an image with white, cyan, magenta, yellow, and black toners by the white, cyan, magenta, yellow, and black image forming units 20W, 20C, 20M, 20Y, and 20Bk when a special color printing mode as a third print mode is set by the print mode management part 89.

The correction process part 82 performs the correction process for the image forming unit positioned at the lower position when printing in the print mode set by the print mode management part 89, among the image forming units 20W, 20C, 20M, 20Y, and 20Bk. In this embodiment, the correction process part 82 not only performs the correction process for the image formed on the sheet P, such as a color shift correction, a density correction, etc., but also performs the correction process for the setting value of the printer engine part such as the correction of the high voltage applied to the charge roller, the development roller, the toner supply roller, the primary transfer roller 45, the secondary transfer roller 46, etc., and the correction process for the maintenance and management of the printer 10, such as, e.g., the disposal of the toner removed by the cleaning device 48 and cleaning of each type of rollers.

Each correction process, other than performed as an initial operation when the power source of the printer 10 is turned on, is performed regularly at the timing in which the print mode is switched, or when printing is performed continuously.

Note that the color shift correction is for getting rid of the displacement of the transfer position of the color toner image when the color toner images are superimposed and transferred onto the intermediate transfer belt 44, and the density correction is for adjusting the concentration of each color toner image when forming each color toner image on the photosensitive drums 21.

The print mode management part 89 sets the monochrome print mode, the color print mode, and the special color print mode for the printer 10 and also judges the print mode set for the printer 10.

Next, the operation of the printer 10 will be explained.

Figure 3:
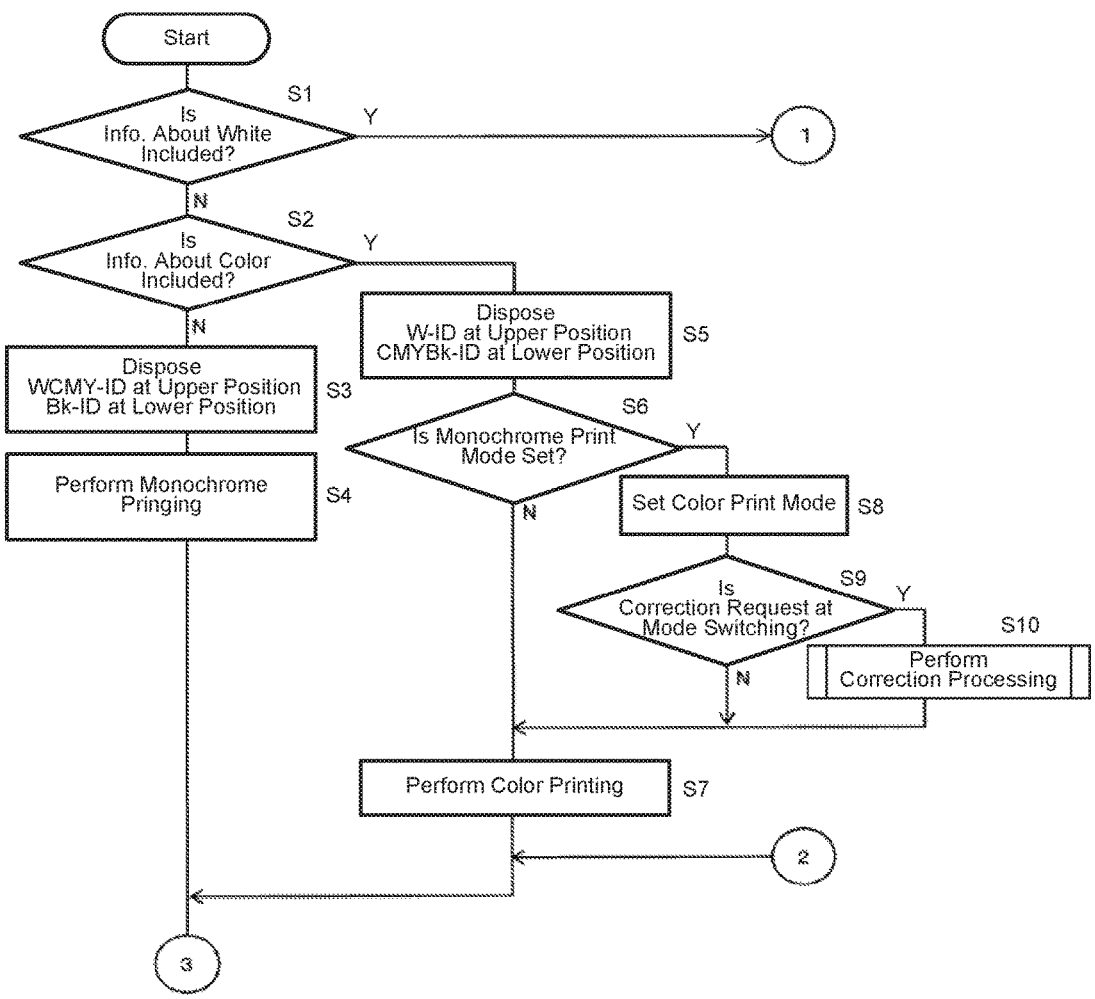
FIG. 3 is a first float chart showing the operation of the printer according to the embodiment of the present invention.
Figure 4:
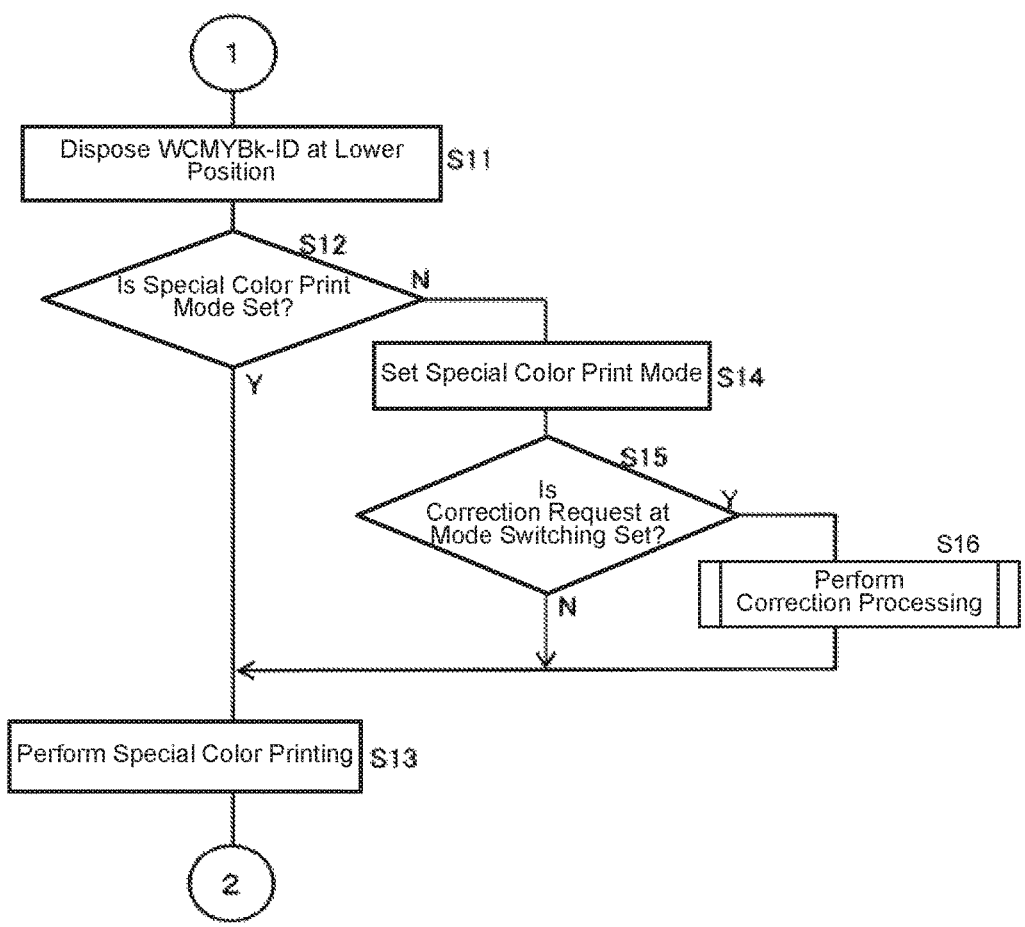
FIG. 4 is a second float chart showing the operation of the printer according to the embodiment of the present invention.
Figure 5:
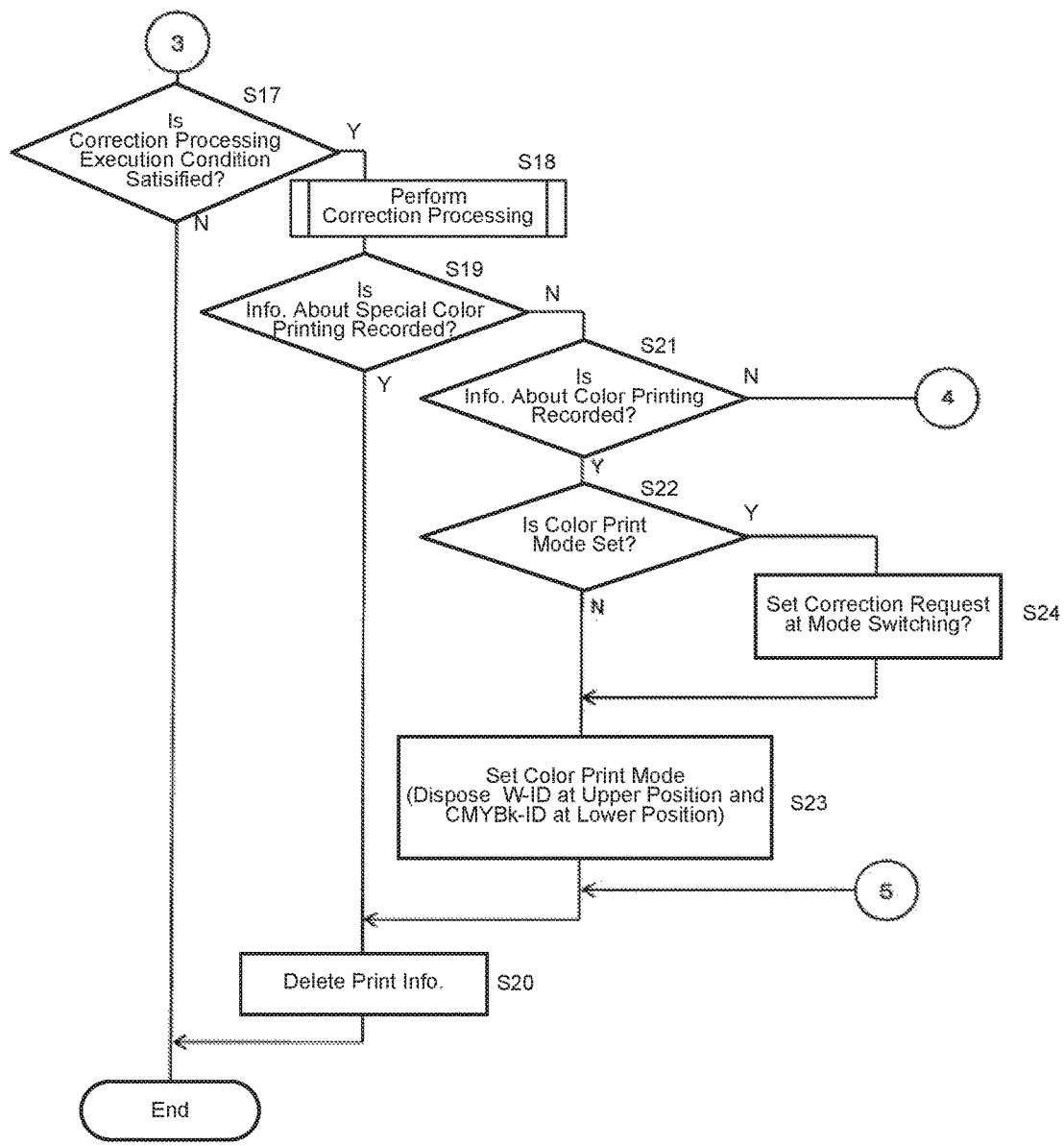
FIG. 5 is a third float chart showing the operation of the printer according to the embodiment of the present invention.
Figure 6:
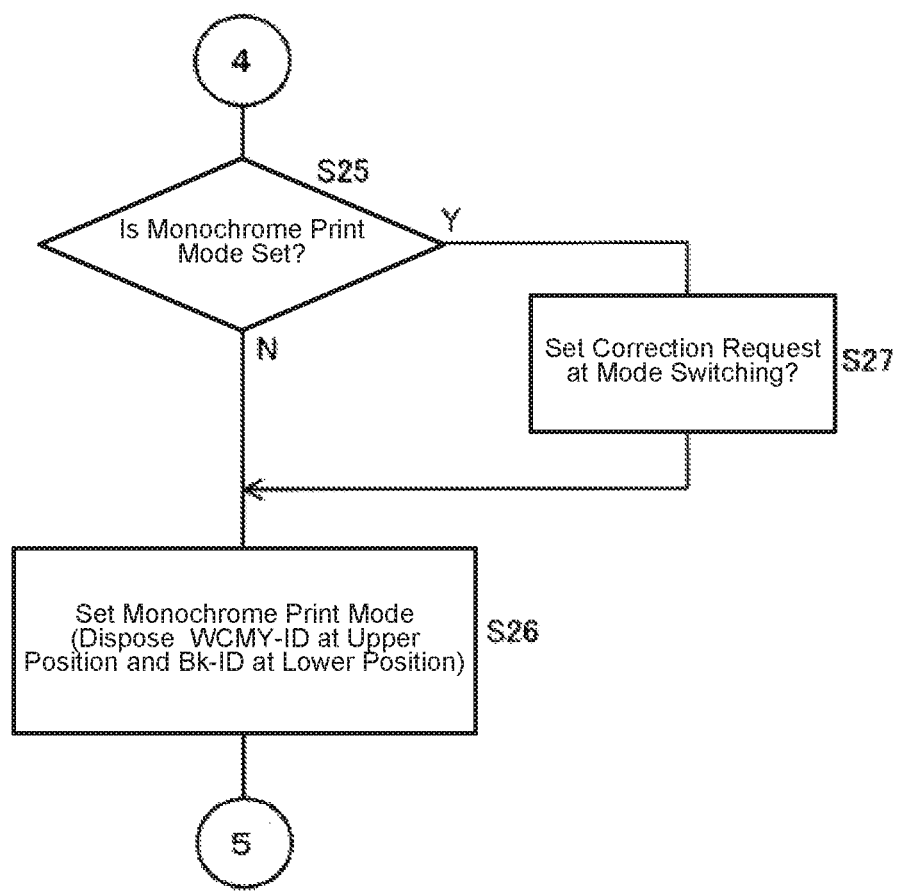
FIG. 6 is a fourth float chart showing the operation of the printer according to the embodiment of the present invention.

FIG. 3 is a first flowchart showing the operation of a printer according to an embodiment of the present invention, FIG. 4 is a second flowchart showing the operation of a printer according to an embodiment of the present invention, FIG. 5 is a third flowchart showing the operation of a printer according to an embodiment of the present invention, and FIG. 6 is a fourth flowchart showing the operation of a printer according to an embodiment of the present invention. Also, in the first to fourth flowcharts, for convenience, the image forming units 20W, 20C, 20M, 20Y, and 20Bk are labeled as WCMYBk-ID, the image forming units 20C, 20M, 20Y, and 20Bk are labeled as CMYBk-ID, the image forming unit 20W is labeled as W-ID, and the image forming unit 20Bk is labeled as Bk-ID.

First, in the initial operation, the correction process part 82 performs correction process for the image forming units 20W, 20C, 20M, 20Y, and 20Bk such as a color shift correction, a density correction, etc.

Then, when print data, a print command, etc., are transmitted from the host computer 71, the reception process part 72 receives and analyzes the print data, the print command, etc., generates color information included in the print data, and sends it to the engine control part 75 with the print data.

In the engine control part 75, the main controller 80 sends the print data to the image forming part 81 upon receiving the print data and the color information, and also judges whether or not the special color printing will be performed in the printer 10 based on whether or not information about white is included in the color information.

When information about white is not included in the color information and the special color printing is not performed in the printer 10, the main controller 80 judges whether or not color printing will be performed in the printer 10 based on whether or not information about cyan, magenta and, yellow that is, information of color, is included in the color information.

When information about color is not included in the color information and color printing is not performed in the printer 10, the estrangement controller 88 drives each elevation motor 68 and arranges the image forming units 20W, 20C, 20M, and 20Y in the upper position and the image forming unit 20Bk in the lower position.

Then, the image forming part 81 sends an instruction to the belt running part 83, the fuser controller 84, the medium carrying part 85, the primary transfer controller 86, and the secondary transfer controller 87, and performs monochrome printing with the black image forming unit 20Bk. Furthermore, the print mode management part 89 records the monochrome printing information showing that the monochrome printing was performed in the print information recording part set as a buffer in the engine control part 75 that is not illustrated.

Further, when information about white and information about color are not included in the color information, the monochrome print mode is not set, the image forming units 20W, 20C, 20M, and 20Y are disposed at the upper position, the image forming unit 20Bk is disposed at the lower position, and the monochrome printing is performed while the monochrome print mode is not set and the special color print mode or the color print mode is set.

On the other hand, when information about color is included in the color information and the color printing is performed in the printer 10, the estrangement controller 88 drives the elevation motors 68 and disposes the image forming unit 20W in the upper position and the image forming units 20C, 20M, 20Y, and 20Bk in the lower position.

Next, the print mode management part 89 judges whether or not the monochrome print mode is set for the printer 10, and when the monochrome print mode is not set, the image forming part 81 sends an instruction to the belt running part 83, the fuser controller 84, the medium carrying part 85, the primary transfer controller 86, and the secondary transfer controller 87, and performs color printing with the cyan, magenta, yellow, and black image forming units 20C, 20M, 20Y, and 20Bk. Further, the print mode management part 89 records information about the color printing showing that the color printing was performed in the print information recording part.

In judging whether or not the monochrome print mode is set for the printer 10, when it is judged that the monochrome print mode is not set, the color print mode is set or the special color print mode is set.

When the color print mode is set or the special color print mode is set, since at least the cyan, magenta, yellow, and black image forming units 20C, 20M, 20Y, and 20Bk are used accompanying the color printing or the special color printing at the time of setting the print mode, the correction process has already been performed for the cyan, magenta, yellow, and black image forming units 20C, 20M, 20Y, and 20Bk. Therefore, when the monochrome print mode is not set, since color printing is performed in a state in which the color print mode or the special color print mode is set, it is not necessary to perform correction process by the correction process part 82.

On the other hand, when the monochrome print mode is set for the printer 10, the print mode management part 89 switches the print mode and sets the color print mode for the printer 10.

Next, the correction process part 82 judges whether or not correction process is necessary due to the print mode being switched by the print mode management part 89 and the color print mode being set for the printer 10 based on whether or not the correction request at mode switching is set.

In addition, in this embodiment, based on the print performance, the monochrome printing, the color printing, and the special color printing, the predetermined print mode is disabled by disposing the image forming unit assumed to not be used for a predetermined period at the upper position. In this case, since the image forming unit of the disabled print mode is not used, not only the lifespan of the image forming unit can be lengthened and the deterioration of the toner can be prevented, but unnecessary consumption of toner for performing the correction process such as a color shift correction, a density correction, etc., can be prevented.

Therefore, in this embodiment, other than the correction process performed at the timing at which the print mode is switched, correction process is regularly performed, and each time the correction process is performed, based on the printing performance since the previous correction process was performed, it is judged whether or not printing in a special color print mode was performed in a predetermined period, and when printing in a special color print mode was not performed, the special color print mode is disabled, the white image forming unit 20W is disposed at the upper position, and the print mode automatically switches to the color print mode. Also, when it is judged whether printing in the color print mode was performed in a predetermined period and printing in the color print mode was not performed, the color print mode is disabled, the cyan, magenta, and yellow image forming units 20C, 20M, and 20Y are disposed at the upper position, and the print mode is automatically switched to the monochrome print mode.

Then, after that, when new print data is transmitted from the host computer 71 and printing is performed in the disabled print mode, the print mode management part 89 sets the correction request at mode switching so that correction process is performed for the image forming unit disposed in the upper position.

That is, the print mode management part 89 sets the correction request at mode switching so that when new print data is transmitted from the host computer 71, the print mode is switched, and the disabled print mode, for example, the color print mode is set, correction process is performed for the cyan, magenta, yellow, and black image forming units 20C, 20M, 20Y, and 20Bk, or when the special color print mode is set, correction process such as a color shift correction, a density correction, etc., is performed for the white, cyan, magenta, yellow, and black 20W, 20C, 20M, 20Y, and 20Bk.

Therefore, as described above, when the print mode management part 89 switches the print mode and sets the color print mode for the printer 10, the correction process part 82 judges whether or not the correction request at mode switching is set, and performs the correction process when the correction request at mode switching is set. The image forming part 81 performs color printing after the correction process when the correction request at mode switching is set and performs color printing immediately when the correction request at mode switching is not set.

Then, in judging whether or not information about white is included in the color information, when information about white is judged to be included in the color information and the special color printing is performed with the printer 10, the estrangement controller 88 drives the elevation motors 68 and disposes the image forming units 20W, 20C, 20M, 20Y, and 20Bk in the lower position.

Next, the print mode management part 89 judges whether or not the special color print mode is set for the printer 10, and when the special color print mode is set, the image forming part 81 sends an instruction to the belt running part 83, the fuser controller 84, the medium carrying part 85, the primary transfer controller 86, and the secondary transfer controller 87, and performs the special color printing with the white, cyan, magenta, yellow, and black image forming units 20W, 20C, 20M, 20Y, and 20Bk. Also, the print mode management part 89 records the information about the special color printing showing that the special color printing was performed in the print information recording part.

On the other hand, when the special color print mode is not set, the print mode management part 89 switches the print mode, sets the special color print mode for the printer 10, and the correction process part 82 judges whether or not the correction request at mode switching is set and performs the correction process when the correction request at mode switching is set. Then, the image forming part 81 immediately performs the special color printing after the correction process when the correction request at mode switching is set and when the correction request at mode switching is not set.

In this way, when monochrome printing, color printing, or special color printing is performed based on print data, print command, etc., transmitted from the host computer 71, the correction process part 82 reads the count value of the drum counter that is not illustrated and arranged in the engine control part 75, and after performing the previous correction process, based on whether or not printing was performed for a predetermined number of sheets, which is 500 sheets of sheets P in this embodiment, regularly judges the execution condition of a regular correction process, that is, whether or not a correction process execution condition is satisfied, and when printing is performed for 500 sheets of sheets P and the correction process execution condition is satisfied, regularly performs correction process according to the current print mode that is set by the print mode management part 89.

That is, the correction process part 82 performs correction process for the image forming method 20Bk when the current print mode is the monochrome print mode, performs correction process for the cyan, magenta, yellow, and black image forming units 20C, 20M, 20Y, and 20Bk when the print mode is the color print mode, and performs correction process for the white, cyan, magenta, yellow, and black image forming units 20W, 20C, 20M, 20Y, and 20Bk when the print mode is the special color print mode.

In this case, not only correction process for images formed on the sheet P as described above is performed, but correction process such as correction process for the setting value for the printer engine part, correction process for the maintenance and management, etc., are performed.

In this embodiment, it is judged whether or not the correction process execution condition is satisfied based on whether or not printing was performed for 500 sheets of sheets P after the previous correction process was performed, but it can be judged whether or not the correction process execution condition is satisfied based on whether or not a predetermined time has passed after the previous correction process was performed. Furthermore, after the previous correction process is performed, based on whether the environmental temperature, the environmental humidity, and the temperature inside the device main body, etc., have changed a predetermined amount, it can be judged whether or not the correction process execution condition is satisfied.

Also, in this embodiment, whether or not printing was performed for 500 sheets of sheets P is judged after the previous correction process is performed, but for example, the correction process execution condition can be made different by the content of the correction process, such as by making the number of sheets P of which printing was performed after the previous color shift correction was performed and the number of sheets P of which printing was performed after the previous a density correction was performed.

In the print information recording part, when printing in a predetermined print mode is performed after the previous regular correction process, print information showing such information is recorded.

The print mode management part 89 refers to the print information recording part and judges whether or not printing in the special color print mode was performed after the previous regular correction process was performed by whether or not the information about the special color printing is recorded in the print information recording part, and performs the setting of the print mode based on the judgment result.

That is, when the information about the special color printing is recorded, since it can be assumed that special color printing will be performed in the future, the print mode management part 89 deletes the information about the printing in the print information recording part without changing the print mode.

In this embodiment, when the regular correction process is performed, until the next regular correction process is performed, the information about the printing is recorded, and the information about the monochrome printing is recorded when monochrome printing is performed, information about color printing is recorded when color printing is performed, and information about special color printing is recorded when special color printing is performed. Then, when the next correction process is performed, based on the information about printing recorded in the print information recording part, the predetermined print mode is disabled, the correction request at mode switching is set, and then the information about the printing in the print information recording part is deleted.

Also, in judging whether or not information about special color printing is recorded in the print information recording part, when it is judged that information about the special color printing is not recorded in the print information recording part, the print mode management part 89 judges whether or not information about the color printing is recorded in the print information recording part. When information about color printing is recorded in the print information recording part, it can be understood that the special color printing was not performed after the previous regular correction process was performed until printing was performed on 500 sheets of the sheet P, and at least a color printing was performed.

Therefore, until the next regular correction process is performed, special color printing is not performed, and it is assumed that at least color printing will be performed.

Therefore, the print mode management part 89 assumes that color printing will be performed and disables the special color print mode.

For that, the print mode management part 89 judges whether or not the color print mode is set for the printer 10, and when the color print mode is not set, the color print mode is set, and the estrangement controller 88 drives the elevation motors 68 to dispose the white image forming unit 20W to the upper position, and the cyan, magenta, yellow, and black image forming units 20C, 20M, 20Y, and 20Bk to the lower position.

Therefore, until new print data is transmitted from the host computer 71 and printing is performed in the disabled special color print mode, or the next regular correction process is performed, since the white image forming unit 20W disposed at the upper position continues to be disposed at the upper position, the lifespan of the white image forming unit 20W can be lengthened, deterioration of the white toner can be prevented, and unnecessary consumption of the white toner can be prevented.

On the other hand, when the color print mode is currently set, since regular correction process is not performed for the white image forming unit 20W when the correction process execution condition is satisfied, afterward, when new print data is transmitted form the host computer 71 and the special color print mode is set, that is, when the print mode is switched from the monochrome print mode or the color print mode to the special color print mode, it is necessary to perform correction process for the white image forming unit 20W. Therefore, after that, when the special color print mode is set, the print mode management part 89 sets the correction request at mode switching so that the correction process is performed for the white image forming unit 20W.

Also, in judging whether or not information about color printing is recorded in the print information recording part, when it is judged that information about color printing is not recorded, it can be understood that after the previous regular correction process was performed and until printing was performed on 500 sheets P, only monochrome printing was performed and the special color printing or color printing were not performed.

So, the print mode management part 89 judges whether or not monochrome print mode is currently set for the printer 10.

When the monochrome print mode is not currently set, it can be understood that after the previous regular correction process was performed and until printing was performed on 500 sheets P, only monochrome printing was performed and the special color printing or color printing were not performed.

Therefore, the print mode management part assumes that monochrome printing will be performed without performing the special color printing and the color printing.

Therefore, the print mode management part 89 assumes that monochrome printing will be performed and disables the special color print mode and the color print mode.

For that, the print mode management part 89 judges whether or not the monochrome print mode is currently set for the printer 10, and when the monochrome mode is not set, the monochrome mode is set, and the estrangement controller 88 drives the elevation motors 68 to dispose the white, cyan, magenta, and yellow image forming units 20W, 20C, 20M, and 20Y to the upper position, and the black image forming unit 20Bk to the lower position.

Therefore, until new print data is transmitted from the host computer 71 and printing is performed in the disabled special color print mode or color print mode, or the next regular correction process is performed, since the white, cyan, magenta, and yellow image forming units 20W, 20C, 20M, and 20Y disposed at the upper position continue to be disposed at the upper position, the lifespan of the white, cyan, magenta, and yellow image forming units 20W, 20C, 20M, and 20Y can be lengthened, deterioration of the white toner can be prevented, and unnecessary consumption of the white, cyan, magenta, and yellow toners can be prevented.

On the other hand, when the monochrome print mode is currently set, since regular correction process is not performed for the white, cyan, magenta, and yellow image forming units 20W, 20C, 20M, and 20Y when the correction process execution condition is satisfied, afterward, when new print data is transmitted form the host computer 71 and the special color print mode or the color print mode is set, that is, when the print mode is switched from the monochrome print mode to the special color print mode or the color print mode, it is necessary to perform correction process for the white image forming unit 20W, and the cyan, magenta, and yellow image forming units 20C, 20M, and 20Y. Therefore, after that, when the special color print mode is set, the print mode management part 89 sets the correction request at mode switching so that the correction process is performed for the white image forming unit 20W and the cyan, magenta, and yellow image forming units 20C, 20M, and 20Y.

In this way, in this embodiment, since the correction process execution condition is satisfied, the correction process are regularly performed, and after the previous regular correction process is performed, whether or not the predetermined print mode was performed is judged, and the print mode is set based on the judgment result, when the special color print mode is not performed during the predetermined period, it automatically switches to the color print mode or the monochrome print mode, and when the color print mode was not performed, it automatically switches to the monochrome print mode.

Therefore, since correction process is performed for an image forming unit among image forming units 20W, 20C, 20M, 20Y, and 20Bk, that is, an image forming unit used in the set print mode, that is disposed at the lower position when printing is performed in the set print mode, the correction process is not performed for the image forming unit disposed at the upper position.

As a result, the lifespan of the image forming units 20W, 20C, 20M, 20Y, and 20Bk will not be shortened from performing the correction process.

That is, when the image forming units 20W, 20C, 20M, 20Y, and 20Bk are disposed at the upper position, the photosensitive drums 21, the charge roller, the development rollers, the toner supply rollers, etc., are stopped, and voltage is not applied to the charge rollers, development rollers, toner supply rollers, etc. Therefore, not only the lifespans of the image forming units 20W, 20C, 20M, 20Y, and 20Bk can be lengthened, but the toners contained inside the toner cartridges 22 can be prevented from deteriorating by rubbing against the development rollers, the toner supply rollers, etc., and blushing due to unnecessary adhesion of the toner on the photosensitive drum 21 can be prevented from occurring on the sheet P on which images are formed.

Furthermore, since the photosensitive drums 21, the charge roller, development rollers, the toner supply rollers, etc., are stopped, the white, cyan, magenta, yellow, and black toners are not unnecessarily consumed.

Next, the flowchart will be explained.

In Step S1, the main controller 80 judges whether or not information about white is included in the color information. When information about white is included in the color information, it proceeds to Step S12, and when information about white is not included in the color information, it proceeds to Step S2.

In Step S2, the main controller 80 judges whether or not information about color is included in the color information. When information about color is included in the color information, it proceeds to Step S6, and when information about color is not included in the color information, it proceeds to Step S3.

In Step S3, the estrangement controller 88 disposes the image forming units 20W, 20C, 20M, and 20Y at an upper position and the image forming unit 20Bk at a lower position.

In Step S4, the image forming part 81 performs monochrome printing with the black image forming unit 20Bk.

In Step S5, the estrangement controller 88 disposes the image forming unit 20W at an upper position and the image forming units 20C, 20M, 20Y, and 20Bk at a lower position.

In Step S6, the print mode management part 89 judges whether or not monochrome print mode is set for the printer 10.

When the monochrome print mode is set for the printer 10, it proceeds to Step S8, and when the monochrome print mode is not set, it proceeds to Step S7.

In Step S7, the image forming part 81 performs color printing with the cyan, magenta, yellow, and black image forming units 20C, 20M, 20Y, and 20Bk.

In Step S8, the print mode management part 89 judges whether or not the color print mode is set for the printer 10. In a case where the special color print mode has been set, and "No" is selected at Step 6, it proceeds to Step 7. At that time, it preforms a color printing with the special color print mode at Step 8.

In Step S9, the correction process part 82 judges whether or not the correction request at mode switching is set. When the correction request at mode switching is set, it proceeds to Step S10 and when the correction request at mode switching is not set, it proceeds to Step S7.

In Step S10, the correction process part 82 performs the correction process.

In Step S11, the estrangement controller 88 disposes the image forming units 20W, 20C, 20M, 20Y, and 20Bk at a lower position.

In Step S12, the print mode management part 89 judges whether or not the special color print mode is set for the printer 10. When the special color print mode is set for the printer 10, it proceeds to Step S13, and when the special color print mode is not set, it proceeds to Step S14.

In Step S13, the image forming part 81 performs special color printing with the white, cyan, magenta, yellow, and black image forming units 20W, 20C, 20M, 20Y, and 20Bk.

In Step S14, the print mode management part 89 sets the special color print mode for the printer 10.

In Step S15, the correction process part 82 judges whether or not the correction request at mode switching is set. When the correction request at mode switching is set, it proceeds to Step S16 and when the correction request at mode switching is not set, it proceeds to Step S13.

In Step S16, the correction process part 82 performs the correction process.

In Step S17, the correction process part 82 judges whether or not the correction process execution condition is satisfied. When the correction process execution condition is satisfied, it proceeds to Step S18, and when the correction process execution condition is not satisfied, the process is finished.

In Step S18, the correction process part 82 performs regular correction process according to the print mode currently set by the print mode management part 89.

In Step S19, the print mode management part 89 judges whether or not information about the special color printing is recorded in the print information recording part. When the information about the special color print mode is recorded in the print information recording part, it proceeds to Step S20, and when information about the special color print mode is not recorded, it proceeds to Step S21.

In Step S20, the print mode management part 89 deletes the information in the print information recording part and finishes the process.

In Step S21, the print mode management part 89 judges whether or not information about color printing is recorded in the print information recording part. When the information about color printing is recorded in the print information recording part, it proceeds to Step S22, and when information about color printing is not recorded, it proceeds to Step S25.

In Step S22, the print mode management part 89 judges whether or not the color print mode is set for the printer 10. When the color print mode is set for the printer 10, it proceeds to Step S24, and when the color print mode is not set, it proceeds to Step S23.

In Step S23, the print mode management part 89 sets the color print mode and the estrangement controller 88 disposes the white image forming unit 20W at the upper position, and the cyan, magenta, yellow, and black image forming units 20C, 20M, 20Y, and 20Bk at the lower position.

In Step S24, the print mode management part 89 sets the correction request at mode switching.

In Step S25, the print mode management part 89 judges whether or not monochrome print mode is set for the printer 10. When the monochrome print mode is set for the printer 10, it proceeds to Step S27, and when the monochrome print mode is not set, it proceeds to Step S26.

In Step S26, the print mode management part 89 sets the monochrome print mode and the estrangement controller 88 disposes the white, cyan, magenta, and yellow image forming units 20W 20C, 20M, and 20Y to the upper position, and the black image forming unit 20Bk to the lower position.

In Step S27, the print mode management part 89 sets the correction request at mode switching.

In this embodiment, a printer 10 using an intermediate transfer system in which the toner image of each color is transferred to an intermediate transfer belt 44, but the present invention can be applied to a printer using a direct transfer system in which the toner image of each color is directly transferred to a sheet P. In that case, the sheet P becomes a transfer medium for transferring the toner image of each color.

Further, in this embodiment, in addition to the cyan, magenta, yellow, and black image forming units 20C, 20M, 20Y, and 20Bk used for a normal color printer, a white image forming unit 20W is arranged as a special color, but image forming units of other colors as a special color such as clear, gold, silver, etc., can be arranged.

Furthermore, in this embodiment, the color print mode is set to perform color printing, but cyan print mode, magenta print mode, yellow print mode, etc., can be set for each color.

Also, a printer 10 is explained in this embodiment, but the present invention can be applied to an image forming apparatus such as a photocopier, facsimile, multifunction machine, etc.

Further, the present invention is not limited to the embodiments and can be modified in various ways based on the purpose of the present invention, which are not excluded from the range of the present invention.

In the invention, the print modes are determined depending on which colors/toners are to be used for a printing. For example, the special color print mode means to be able to use WYMCK toners and etc. The color print mode means to be able to use YMCK toners. The monochrome print mode means to be able to use K toner only.

Also, the correction processes means a standard/common process that is required by departing/contacting ID units. They may be regarded as calibrations. Particularly, the correction processes may be directed to voltages, LED light amounts, LED radiation timings etc. As results of these correction processes, several types of corrections are achieved such as a density correction for correcting densities or variations of each color, or color gap correction in order to properly overlap colors.

What is claimed is:

1. An image forming apparatus comprising:
    (a) a plurality of image forming units, which are designed for different colors, that are arranged along a transfer medium, each of which is arranged in a movable manner in up and down directions with respect to the transfer medium such that each of the image forming units is movable between a lower position and an upper position, at the lower position where image carriers of the image forming units are able to come into contact with the transfer medium and at the upper position where the image carriers are distant from the transfer medium;
    (b) an estrangement controller that is configured to move each of the image forming units between the lower position and the upper position;
    (c) a print mode management part that is configured to determine one print mode among a plurality of print modes wherein the one print mode is defined as a designated print mode;
    (d) an image forming part that is configured to select one or more of the image forming units that correspond to the designated print mode, and to form an image to be transferred to the transfer medium by using the selected image forming units such that a print process is performed with the image formed by the selected image forming units; and
    (e) a correction process part that performs a correction process for the selected image forming units disposed at the lower position when the print process is performed in the designated print mode, wherein
    (f) the correction process part regularly judges whether or not a correction process execution condition is satisfied, and performs a regular correction process when the correction process execution condition is satisfied, and
    (g) the print mode management part judges whether or not another print process in the designated print mode has been performed after a previous regular correction process, which was performed most recently, was performed, and sets a print mode based on a judgment result by the print mode management part.

2. The image forming apparatus according to claim 1, wherein
    the print mode management part sets a correction request at mode switching in order to execute another correction process when the print mode is switched from one of the print modes to another one of the print modes according to the designated print mode, the another correction process being defined as a correction process at mode switching.

3. The image forming apparatus according to claim 2, wherein
    the correction process part
        judges whether or not the correction request at mode switching is set when the print mode is switched, and performs the correction process at mode switching when the correction request at mode switching is set, and does not perform the correction process at mode switching when the correction request at mode switching is not set.

4. The image forming apparatus according to claim 1, wherein the image forming apparatus performs the print process based on print data transmitted from a host device wherein the print data includes color information indicating one or more of colors to be used in the print process, the estrangement controller disposes each of the selected image forming units either at the lower position or the upper position based on the color information included in the print data.

5. The image forming apparatus according to claim 1, wherein the image forming apparatus performs the print process based on print data transmitted from a host device wherein the print data includes color information indicating one or more of colors to be used in the print process, the print mode management part sets the designated print mode based on the color information included in the print data.

6. The image forming apparatus according to claim 1, wherein one of the image forming units has an image carrier on which a latent image is developed with developer, the transfer medium with which the image carrier comes into contact when the image forming unit is disposed at the lower position is a sheet.

7. The image forming apparatus according to claim 1, wherein one of the image forming units has an image carrier on which a latent image is developed with developer, the transfer medium with which the image carrier comes into contact when the image forming unit is disposed at the lower position is an intermediate transfer belt, the intermediate transfer belt is an endless belt that circulates during the print process, receives an developed image created by the image forming unit from the image forming unit at a contact spot with the image forming unit, and transfers the developed image to a sheet at a different spot from the contact spot.

8. The image forming apparatus according to claim 1, wherein the print mode management part sets at least three print modes that are a monochrome print mode for performing a monochrome print process that uses only black toner or ink, a color print mode for performing a color print process that uses multiple color of toners, inks or combination thereof and a special color print mode for performing a special color print process that uses a toner or ink that is not used for the monochrome print process or the color print process.

* * * * *